United States Patent
Lee

(10) Patent No.: US 8,814,047 B2
(45) Date of Patent: Aug. 26, 2014

(54) EXPEDITED IMAGE PROCESSING METHOD

(75) Inventor: Wei Lee, Manlius, NY (US)

(73) Assignee: Jadak, LLC, North Syracuse, NY (US)

( * ) Notice: Subject to any disclaimer, the term of this patent is extended or adjusted under 35 U.S.C. 154(b) by 948 days.

(21) Appl. No.: 12/195,758

(22) Filed: Aug. 21, 2008

(65) Prior Publication Data

US 2010/0044439 A1     Feb. 25, 2010

(51) Int. Cl.
*G06K 7/10* (2006.01)
*G06K 9/20* (2006.01)
*G06K 7/14* (2006.01)

(52) U.S. Cl.
CPC .......... *G06K 9/2063* (2013.01); *G06K 7/10861* (2013.01); *G06K 7/1443* (2013.01)
USPC .............. 235/462.09; 235/462.08; 235/462.1; 235/462.11; 235/462.15

(58) Field of Classification Search
USPC ........................................ 235/462.08, 462.09
See application file for complete search history.

(56) References Cited

U.S. PATENT DOCUMENTS

| 4,124,871 | A | * | 11/1978 | Morrin, II | 358/444 |
| 5,659,800 | A | * | 8/1997 | Zhang et al. | 710/62 |
| 6,565,003 | B1 | * | 5/2003 | Ma | 235/462.1 |
| 2005/0103846 | A1 | * | 5/2005 | Zhu et al. | 235/462.07 |
| 2007/0040035 | A1 | * | 2/2007 | Kotlarsky et al. | 235/462.45 |

\* cited by examiner

*Primary Examiner* — Christopher Stanford
(74) *Attorney, Agent, or Firm* — David L. Nocilly; Bond Schoeneck & King, PLLC

(57) ABSTRACT

A method for expediting the barcode interpretation process implemented on conventional optical imaging barcode readers. The method involves interrupting the mainline processing of the conventional barcode detection, obtaining a copy of the captured image, scaling the image, locating the barcode in the scaled image, scaling the image back to normal proportions, calculating the location of the barcode in the scaled up image, and reporting the barcode location back to the mainline processing for decoding of only the region of interest. The mainline processing of the optical imager may then proceed with barcode interpretation in the area identified by the method of the present invention without wasting time applying complicated decoding algorithms to areas within the image that do not contain any barcode information.

18 Claims, 3 Drawing Sheets

EXPEDITED IMAGE PROCESSING METHOD

BACKGROUND OF THE INVENTION

1. Field of the Invention

The present invention relates to image processing and, more particularly, to a method for expediting image processing in an optical imaging based barcode decoder.

2. Description of the Related Art

In conventional barcode readers using optical imagers, an image of a target is acquired by an optical imager, such as a CCD or CMOS, and then analyzed to determine whether a barcode is present in the acquired image. Typically, the image is scanned by software programmed into a microcontroller interconnected to the imager to detect the characteristic patterns of a one or two dimensional barcode. Unfortunately, when the acquired image contains additional information, such as when the image of the barcode is taken from a position that results in the barcode occupying only a small fraction of the image area, processing the image takes a significant amount of time. This delay is due to the fact that the on-board detection algorithms implemented on the microcontroller analyze the entire captured image for barcode information.

BRIEF SUMMARY OF THE INVENTION

It is therefore a principal object and advantage of the present invention to provide a method for expediting processing of images containing barcodes in an optical imaging barcode decoder.

In accordance with the foregoing objects and advantages, the present invention provides a method for expediting the barcode interpretation process implemented on conventional optical imaging barcode readers. In particular, the method comprises interrupting the mainline processing of the conventional barcode detection process prior to the barcode detection steps, obtaining a copy of the captured image, scaling the image, locating the barcode in the scaled image, scaling the image back to normal proportions, calculating the location of the barcode in the scaled up image using the location identified in the scaled down image, and then reporting the barcode location back to the mainline processing. The mainline processing of the optical imager may then proceed with barcode interpretation in the area identified by the method of the present invention. As a result, barcode interpretation processing rates may be significantly increased with respect to images that contain large amounts of extraneous information in addition to the target barcode.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
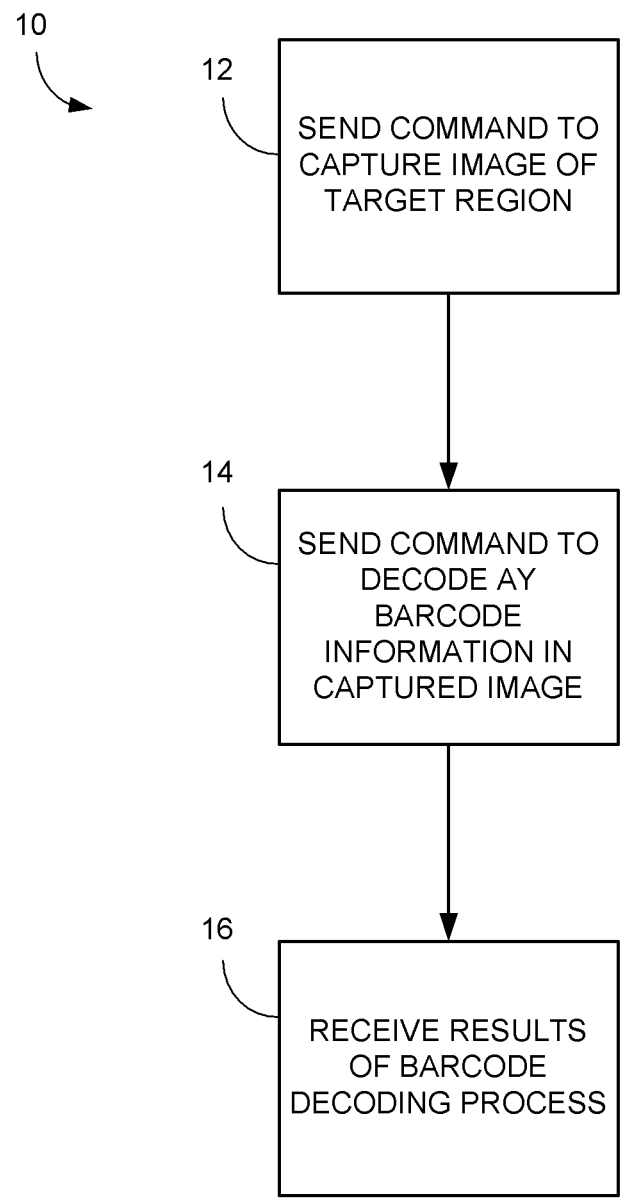
FIG. 1 is a flowchart of a prior art barcode process.

Referring now to the drawings, wherein like reference numerals refer to like parts throughout, there is seen in FIG. 1 a conventional method 10 for barcode decoding in a barcode decoder, whether handheld or fixed mount, that includes an optical imager. In particular, process 10 involves the steps of sending a command to capture an image of a target region 12 that contains the barcode to be decoded. Target region 12 may be a barcode on a stationary product or even a moving item, such as a test tube in a rack handling system. Generally, target region 12 includes a barcode as well as a certain amount of background that does not contain any barcode information. Next, a command is sent to instruct the processor of the decoder to decode information contained in the captured image. Finally, after a delay during which the processor implements algorithms to locate and decode any barcode information in the captured image, the results of the barcode decoding process are received 16. For example, the results may be output to a host system interconnected to the reader.

Figure 2:
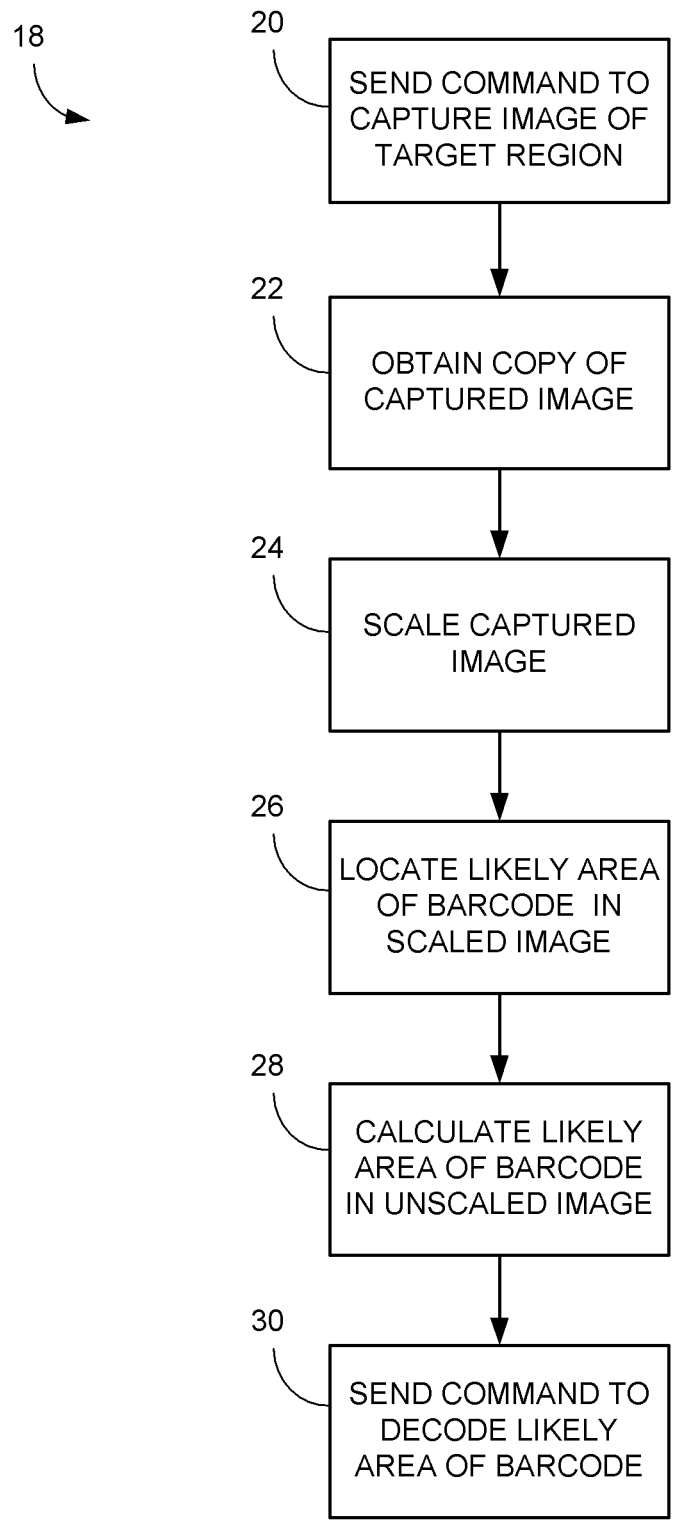
FIG. 2 is flowchart of a method according to the present invention for expediting barcode decoding in an optical imaging barcode decoder.

Referring to FIG. 2 is an expedited processing method 18 for improving the response time of barcode decoding processing in conventional barcode readers having optical imagers associated therewith. Expedited processing method 18 may be implemented in a microcontroller associated position on the printed circuit board containing the conventional barcode decoder and imager, or in a microcontroller or microprocessor associated with a host device that is interconnected to a barcode decoder.

In particular, method 18 comprises the steps of sending a command to capture an image of the target region 20, obtaining a copy of the captured image 20, scaling the captured image 20, locating the likely area of the barcode in the scaled image 22, calculating the likely area of the barcode in the unscaled image 24, and sending a command to decode just the likely area of the barcode. The mainline processing of the optical imager decoder or microcontroller may then proceed to interpret barcode interpretation only in the area identified by the method of the present invention. As a result, barcode interpretation processing rates may be significantly increased with respect to images that contain large amounts of extraneous background information in addition to the target barcode.

The step of sending a command to capture an image of the target region 20 comprises the conventional step of sending the appropriate command to the imager control circuitry, such as a microcontroller, using the appropriate command or byte string to capture an image of the region including a barcode to be decoded. Most optical imaging barcode decoders include commands for instructing the imager to capture an image and may thus be commanded as in conventional systems. For example, the imager may comprise a complementary metal oxide semiconductor (CMOS) image sensor and be capable of reading and interpreting two-dimensional images, such as 1D linear codes, 2D stacked/matrix codes, OCR fonts, RSS (Reduced Space Symbology) codes, and postal codes, as well as provides image capturing for use in a wide range of applications, such as image and shape recognition, signature capture, image capture, and optical character recognition (OCR). The imager may comprise an IT4X10/80 SR/SF or IT5X10/80 series imager available from Hand Held Products, Inc. of Skaneateles Falls, N.Y. that is capable of scanning and decoding most standard barcodes including linear, stacked linear, matrix, OCR, and postal codes. The IT5X10/80 series imager is a CMOS-based decoded output engines that can read 2D codes, and has image capture capabilities. The imager is a command operated device that obtains an optical image of the field of view and, using preprogrammed algorithms, deciphers the context of the image to determine the presence of any decodable barcodes, linear codes, matrix codes, and the like.

The step of obtaining a copy of the captured image 22 involves sending the appropriate command to the imager or imager circuitry to have the captured image exported from the local memory of the decode to the microcontroller implementing process 18. For example, step 22 may involve a host device sending the appropriate command to a handheld barcode decode, thereby resulting in the image being transmitted through the host interface to the microcontroller of the host. Preferably, microcontroller implementing process 18 is positioned on a printed circuit board associated with the barcode decoder and imager and connected thereto for maximum speed of transmission of the image. In an alternative embodiment, process 18 may be implemented in separate software installed directly onto the control circuitry of barcode decoder.

The step of scaling the captured image 24 comprises reducing the pixel dimension of the image. Preferably, the image is reduced by one-third to one-forth using conventional scaling processes.

Figure 3:
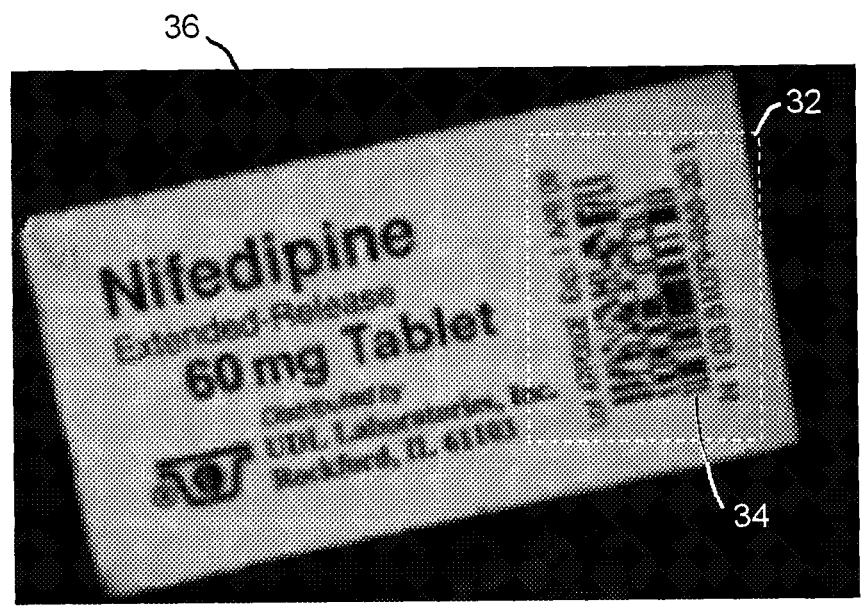
FIG. 3 is an image of a region including a barcode to be decoded prior to processing according to the present invention.
Figure 4:
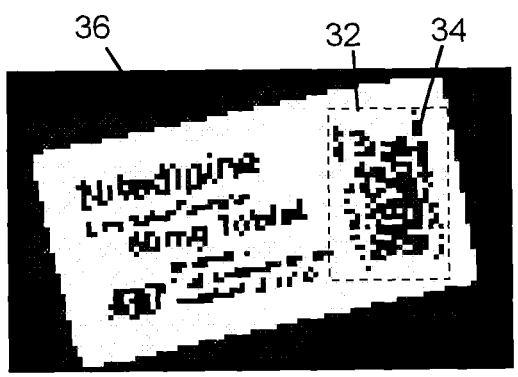
FIG. 4 is an image of a region including a barcode to be decoded after processing according to the present invention.

The step of locating the likely area of the barcode in the scaled image 26 comprises searching for the likely location of the barcode within the scaled down image. The likely location is found by thresholding the scaled image to convert the image into a binary representation of the image field that is predominantly black in the areas of non-interest and white in the area of interest that includes the barcode to be decoded. There is seen in FIG. 3 a captured image including a region of interest 32 having a barcode 34 therein, and a region of non-interest 36 in the remaining area of the image. After thresholding, region of interest 32 and region of non-interest 36 will be represented in binary, i.e., they will appear in white and black only.

Preferably, the thresholding is performed dynamically to account for variations in the color of paper used for the barcode, other items within the field of view, the lighting, etc. Dynamic thresholding may be accomplished based on the brightness of the entire image. For example, a histogram or average value of the pixels within the image may be used to determine the appropriate threshold level to generate the appropriate thresholded image. Preferably, the dynamic thresholding comprises counting the number of pixels having non-black pixel values in the image and setting the threshold at a certain percentage of the non-black pixels. For example, the threshold may be set at ten percent, thus resulting in the lowest value pixels being set as black, and the higher pixels set at white. It should be recognized by those of skill in the art that the particular percentages may be adapted depending on the particular image scenario, such as whether the imager is handheld or fixed mount, or the typical or expected characteristics of the barcode environment, such as the nature and contrast characteristics of the surrounding environment.

After the appropriate thresholding has been completed, as seen in FIG. 3, the region of interest 32 may be located in the image. Preferably, region of interest 32 is located by summing the pixels in both horizontal and vertical rows. The summing will indicate the pixel rows containing region of interest 32 verses regions of non-interest 36. In the example of the present invention where the captured image in converted into binary, with black being represented by a value of zero and white being represented by a value of one, the rows that at least partially contain region on interest 32 will have significantly higher sums that the rows containing only region of non-interest 36. The summing of the rows thus provides an indication where region of interest 32, and the corners of the region of interest 36 can be described using Cartesian geography, i.e., x and y coordinates, for at least two of the corners of region of interest 32.

The step of calculating the likely area of the barcode in the unscaled image 24 comprises multiplying the Cartesian coordinates by the appropriate scale number. For example, if the image was initially scaled down by a factor of four, the coordinates must be multiplied by four to generate the appropriate Cartesian coordinates for region of interest 32 in the normal size image that was captured in step 20.

The step of sending a command to decode the likely area of the barcode 30 involves sending a decode command coupled with the coordinates for region of interest 32 as calculated in step 28. For example, in the IT5X10/80 series imager described above, a decode command string that includes the coordinates may be sent, thereby resulting in the decoding of only region of the interest 32, rather than the entire image, which is the default decoding operation in response to a decode command. As the decoding process is time consuming and involves processing an image using sophistical algorithms, the reduced image size provided by process 18 will significantly reduce decoding time and expedite the decoding process. It should be recognized by those of skill in the art that imagers lacking a predetermined command for decoding that includes coordinates may have to be reprogrammed to accommodate such information. Alternatively, method 18 may include the additional step of cropping the source image stored and used by the imager according to the coordinates of region of interest 32 to avoid the need to reprogram the imager to accept complicated decode commands.

What is claimed is:

1. A method for improved barcode decoding, comprising the steps of:
   sending a command from a microcontroller to an optical imager having a barcode decoder to capture an image of a target region;
   obtaining a copy of said captured image from said optical imager by exporting it from said barcode decoder to said microcontroller prior to said barcode decoder of said imager engaging in decoding operations;
   scaling said captured image by a predetermined value to form a scaled image;
   locating at least two coordinates defining a region of interest in said scaled image;
   calculating a corresponding region of interest in said captured image based on the region of interest in said scaled image; and
   sending a command from said first microcontroller to said barcode decoder of said imager to decode just said corresponding region of interest.

2. The method of claim 1, wherein the step of obtaining a copy of said captured image comprises a second predetermines command from said microcontroller to said optical imager.

3. The method of claim 1, wherein the step of scaling said captured image to form a scaled image comprises reducing a pixel dimension of said captured image by at least one third.

4. The method of claim 1, wherein the step of locating at least two coordinates defining a region of interest in said scaled image comprises applying a threshold to convert said scaled image into binary format.

5. The method of claim 4, wherein said threshold is dynamically determined by calculating a brightness of said scaled image and selecting a threshold representing a predetermined percentage of pixels in said scaled image.

6. The method of claim 4, wherein the step of locating at least two coordinates defining a first region of interest in said scaled image further comprises summing individual pixel rows in said scaled image.

7. The method of claim 6, wherein the step of locating at least two coordinates defining a first region of interest in said scaled image further comprises locating said at least two coordinates based on the summing of the individual pixel rows in said scaled image.

8. The method of claim 1, wherein the step of calculating a corresponding region of interest in said captured image based on the region of interest in said scaled image comprises multiplying said at least two coordinates by said predetermined value to obtain scaled coordinates.

9. The method of claim 8, wherein the step of sending a command to decode just said corresponding region of interest comprises sending a predetermined command containing said scaled coordinates.

10. A barcode image control device, comprising:
an interface interconnected to an optical imager;
a microcontroller interconnected to an optical imager having a barcode decoder, wherein said microcontroller is programmed to send a command through said interface to said imager to create a captured image of a target region, obtain a copy of said captured image through said interface from said imager prior to said barcode decoder of said imager decoding any information in said image, scale said captured image by a predetermined value to form a scaled image, locate at least two coordinates defining a region of interest in said scaled image, calculate a corresponding region of interest in said captured image based on the region of interest in said scaled image; and send a command through said interface to said imager to have said barcode decoder of said imager decode just said corresponding region of interest.

11. The device of claim 10, wherein said microcontroller is further programmed to scale said captured image to form a scaled image by reducing a pixel dimension of said captured image by at least one third.

12. The device of claim 10, wherein said microcontroller is further programmed to locate at least two coordinates defining a region of interest in said scaled image by applying a threshold to convert said scaled image into binary format.

13. The device of claim 11, wherein said microcontroller is further programmed to set said threshold dynamically by calculating the brightness of said scaled image and selecting a threshold representing a predetermined percentage of pixels in said scaled image.

14. The device of claim 10, wherein said microcontroller is further programmed to locate said at least two coordinates defining a first region of interest in said scaled image by summing individual pixel rows in said scaled image.

15. The device of claim 10, wherein said microcontroller is further programmed to calculate a corresponding region of interest in said captured image based on the first region of interest in said scaled image by multiplying said at least two coordinates by said predetermined value to obtain scaled coordinates.

16. The device of claim 10, wherein said microcontroller is further programmed to send a command to decode just said corresponding region of interest by sending a predetermined command containing said scaled coordinates.

17. A method for improved barcode decoding, comprising the steps of:
sending a first predetermined command from a microcontroller to an optical imager having a barcode decoder to instruct said image to capture an image;
sending a second predetermined command from said microcontroller to said optical imager to instruct said imager to export said captured image prior to said barcode decoder of said imager decoding any information in said image;
reducing the pixel dimension of said captured image by a predetermined value;
applying a threshold to convert said scaled image into binary format;
locating at least two coordinates defining a first region of interest in said scaled image by summing individual pixel rows in said scaled image;
calculating a corresponding region of interest in said captured image by multiplying said at least two coordinates by said predetermined value to obtain scaled coordinates;
sending a third predetermined command containing said scaled coordinates from said microcontroller to said imager to instruct said barcode decoder of said imager to decode only said corresponding region of interest.

18. The method of claim 17, wherein said step of applying a threshold to convert said scaled image into binary format comprises dynamically determining said threshold by calculating a brightness of said scaled image and selecting said threshold as representing a predetermined percentage of pixels in said scaled image.

* * * * *